(12) United States Patent
Nádas et al.

(10) Patent No.: US 9,948,563 B2
(45) Date of Patent: Apr. 17, 2018

(54) TRANSMITTING NODE, RECEIVING NODE AND METHODS THEREIN

(71) Applicant: Telefonaktiebolaget L M Ericsson (publ), Stockholm (SE)

(72) Inventors: Szilveszter Nádas, Budapest (HU); János Harmatos, Budapest (HU); György Miklós, Pilisborosjenö (HU); Gergely Pongrácz, Budapest (HU); Sándor Rácz, Cegléd (HU); Zoltán Turányi, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 218 days.

(21) Appl. No.: 14/892,376

(22) PCT Filed: May 23, 2013

(86) PCT No.: PCT/SE2013/050592
§ 371 (c)(1),
(2) Date: Nov. 19, 2015

(87) PCT Pub. No.: WO2014/189422
PCT Pub. Date: Nov. 27, 2014

(65) Prior Publication Data
US 2016/0105369 A1    Apr. 14, 2016

(51) Int. Cl.
*H04L 12/851* (2013.01)
*H04W 72/06* (2009.01)
(Continued)

(52) U.S. Cl.
CPC ...... *H04L 47/2433* (2013.01); *H04L 47/2408* (2013.01); *H04L 47/32* (2013.01);
(Continued)

(58) Field of Classification Search
None
See application file for complete search history.

(56) References Cited

U.S. PATENT DOCUMENTS 8,553,545 B2 * 10/2013 Lee .................. H04L 47/12
370/232
9,025,458 B2 * 5/2015 Chan ................ H04L 41/5022
370/230
(Continued)

FOREIGN PATENT DOCUMENTS

WO   WO 2013/085437 A1   6/2013
WO   WO 2014/063718 A1   5/2014

OTHER PUBLICATIONS

PCT Notification of Transmittal of the International Search Report and the Written Opinion of the International Searching Authority, or the Declaration for International application No. PCT/SE2013/050592, dated Mar. 24, 2014.
(Continued)

*Primary Examiner* — Kashif Siddiqui
(74) *Attorney, Agent, or Firm* — Baker Botts, LLP

(57) ABSTRACT

Embodiments herein relate to a method in a receiving node (12) for handling packets for a wireless device (10) in a radio communications network (1). The receiving node (12) receives a packet from a transmitting node (13). The packet is marked with a value, wherein the value is corresponding to a level of importance of the packet along a linear scale. The receiving node (12) handles the packet based on the value and an expected amount of resources needed to serve the packet.

20 Claims, 15 Drawing Sheets

(51) Int. Cl.
   *H04W 28/02* (2009.01)
   *H04L 12/823* (2013.01)
   *H04W 72/00* (2009.01)
(52) U.S. Cl.
   CPC ........... *H04W 28/02* (2013.01); *H04W 72/06* (2013.01); *H04W 72/00* (2013.01)

(56) References Cited

U.S. PATENT DOCUMENTS

| | | | | |
|---|---|---|---|---|
| 2003/0103520 | A1* | 6/2003 | Chen | H04L 47/14 370/444 |
| 2004/0082364 | A1* | 4/2004 | Kitazawa | H04L 47/14 455/560 |
| 2004/0095901 | A1 | 5/2004 | Rajkotia | |
| 2004/0100941 | A1* | 5/2004 | Lim | H04B 7/1858 370/349 |
| 2004/0240443 | A1* | 12/2004 | Kakani | H04L 47/745 370/389 |
| 2006/0171307 | A1* | 8/2006 | Gopalakrishnan | H04L 1/0007 370/229 |
| 2007/0255850 | A1* | 11/2007 | Gould | G08G 5/0026 709/240 |
| 2008/0020775 | A1* | 1/2008 | Willars | H04L 47/10 455/445 |
| 2009/0067335 | A1* | 3/2009 | Pelletier | H04L 41/5025 370/238 |
| 2011/0069666 | A1* | 3/2011 | Kahn | H04W 72/10 370/329 |
| 2011/0096708 | A1* | 4/2011 | Novak | H04W 52/325 370/311 |
| 2012/0250690 | A1* | 10/2012 | Suh | H04N 21/2381 370/392 |
| 2014/0233479 | A1* | 8/2014 | Dahod | H04W 72/044 370/329 |
| 2014/0321288 | A1* | 10/2014 | Ha | H04W 28/0268 370/237 |
| 2015/0110168 | A1* | 4/2015 | Chi | H04N 21/41407 375/240.01 |
| 2015/0250001 | A1* | 9/2015 | Tan | H04N 21/8455 370/329 |

OTHER PUBLICATIONS

HARQ Power Allocation Schemes for Power-Controlled Systems by Klaus Knoche, Jun. 19-23, 2005.

IEEE Transactions on Mobile Computing, vol. 3, No. 1; QoS-Oriented Packet Scheduling for Wireless Multimedia CDMA Communications by Vincent Huang and Weihua Zhuang, Senior Member, IEEE, Jan.-Mar. 2004.

* cited by examiner

TRANSMITTING NODE, RECEIVING NODE AND METHODS THEREIN

PRIORITY

This nonprovisional application is a U.S. National Stage Filing under 35 U.S.C. § 371 of International Patent Application Serial No. PCT/SE2013/050592, filed May 23, 2013, and entitled "Transmitting Node, Receiving Node And Methods Therein."

TECHNICAL FIELD

Embodiments herein relate to a transmitting node, a receiving node and methods therein. In particular, embodiments herein relate to handling packets in a radio communications network.

BACKGROUND

In a typical radio communications network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS has an essentially "flat" architecture comprising radio base stations without reporting to RNCs.

There are two common ways of defining and signaling desired resource demands to a bottleneck in the radio communications network. A bottleneck being a location in the radio communications network where a single or limited number of components or resources affects capacity or performance of the radio communications network.

The first common way is to pre-signal/pre-configure the desired resource sharing rules for a given traffic aggregate, such as a flow or a bearer, to the bottleneck node prior the arrival of the actual traffic. The bottleneck node then implements the handling of the traffic aggregates based on these sharing rules, e.g. uses scheduling to realize the desired resource sharing. Examples for this pre-signaling/pre-configuration method are e.g. the bearer concept of 3GPP [3GPP TS 23.401], SIRIG [3GPP TS 23.060 section 5.3.5.3], or Resource Reservation Protocol (RSVP) [RFC2205]. An example scheduling algorithm for this method, implementing the 3GPP bearer concept at an LTE eNB, can be found in Wang Min, Jonas Pettersson, Ylva Timner, Stefan Wänstedt and Magnus Hurd, Efficient QoS over LTE—a Scheduler Centric Approach. Personal Indoor and Mobile Radio Communications (PIMRC), 2012 IEEE 23rd International Symposium. Another example for this is to base the resource sharing on Service Value as described in Service Value Oriented Radio Resource Allocation, Invention disclosure, PCT/SE2011/051475.

The second common way is to mark packets with drop precedence, which marks the relative importance of the packets compared to each other. Packets of higher drop precedence are to be dropped before packets of lower drop precedence. An example for such method is DiffServ Assured Forwarding (AF) within a given class [RFC2597]. Also such a method with several drop precedence levels are defined in a Per-Bearer Multi Level Profiling, European Patent Application No. 12167141.6.

It is an open issue how to signal service policies to different resource bottlenecks, including both transport bottlenecks and radio links. The term service policy in this document denotes instructions on how the available resources at a packet scheduler shall distribute the available, primarily transmission, resources among the packets of various packet flows arriving to the scheduler. The term 'resource sharing rules' is used in the same meaning. In the case of radio links, the service policy also needs to define how a terminal dependent radio channel overhead should affect the resource sharing. Such a scheme for signaling is preferably simple, versatile and fast adapts to the actual congestion situation.

Pre-signaling/pre-configuration solutions can describe rich set of different resource sharing policies. However these policies a) have to be configured in advance of actual traffic at all bottlenecks, or b) have to be signaled before the first packet of the flow arrives.

Option a) limits the flexibility of policies, and the pre-configuration of a large number of resource sharing policies takes node resources to maintain which can make it costly. Option b) adds a setup delay and overhead before the first packet can be delivered. In addition, these solutions usually require traffic handling on a per aggregate/flow basis, e.g., to have separate queues per traffic aggregate/flow and implement a per traffic aggregate/flow resource sharing mechanism. While in some cases it is possible to have this, e.g. per bearer handling over air interface, in other cases this puts additional complexity on the system, e.g. over RAN Transport Network (TN) bottlenecks or within bearer differentiation.

Drop precedence marking solutions, as mentioned above, are limited by the interpretation of drop precedence, leading to a limited non-flexible handling of the packets in the radio communications network.

SUMMARY

An object of embodiments herein is to provide a mechanism that enables a flexible handling of packets in an efficient manner.

The object may be achieved by a method in a receiving node for handling packets for a wireless device in a radio communications network. The receiving node receives a packet from a transmitting node. The packet is marked with a value, wherein the value is corresponding to a level of importance of the packet along a linear scale. The receiving node handles the packet based on the value and an expected amount of resources needed to serve the packet.

The object may further be achieved by a method in a transmitting node for handling packets for a wireless device in a radio communications network. The transmitting node marks a packet with a value, which value is corresponding to a level of importance of the packet along a linear scale. The transmitting node transmits the packet to a receiving node.

Furthermore, the object may be achieved by a receiving node for handling packets for a wireless device in a radio communications network. The receiving node comprises a receiving circuit configured to receive a packet from a transmitting node. The packet is marked with a value, wherein the value is corresponding to a level of importance of the packet along a linear scale. The receiving node further comprises a handling circuit configured to handle the packet based on the value and an expected amount of resources needed to serve the packet.

Additionally, the object may be achieved by a transmitting node for handling packets for a wireless device in a radio communications network. The transmitting node comprises a marking circuit configured to mark a packet with a value, which value is corresponding to a level of importance of the packet along a linear scale. The transmitting node further comprises a transmitting circuit configured to transmit the packet to a receiving node.

Embodiments herein enable a flexible handling of packets in an efficient manner to convey a wide range of desired resource sharing policies to a bottleneck. The solution is made possible by taking into account the value and the amount of resources needed when making e.g. resource sharing decisions.

BRIEF DESCRIPTION OF THE DRAWINGS

Embodiments will now be described in more detail in relation to the enclosed drawings, in which.

DETAILED DESCRIPTION

Figure 1:
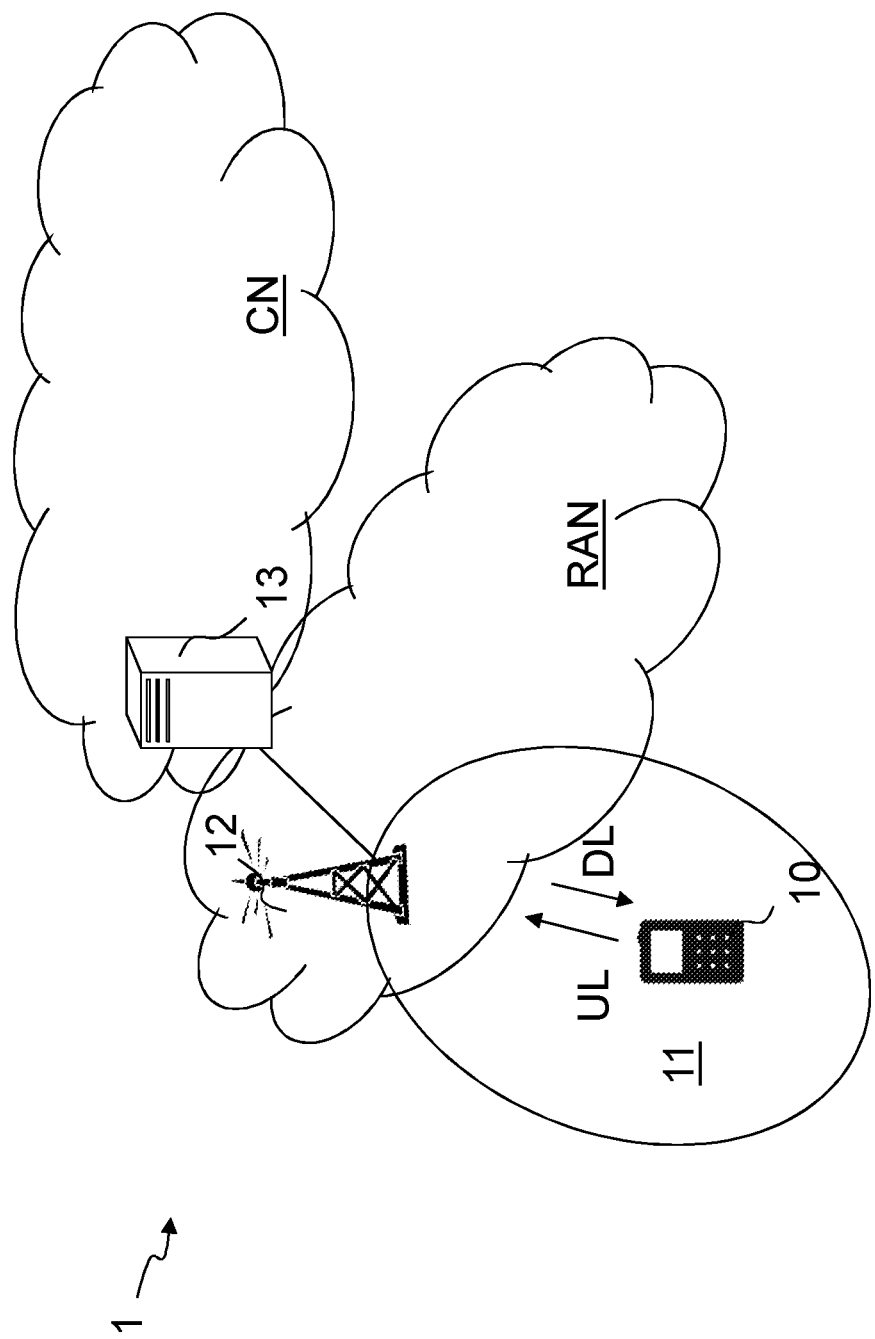
FIG. 1 shows a schematic overview depicting a radio communications network according to embodiments herein.

FIG. 1 is a schematic overview depicting a radio communications network 1. The radio communications network 1 comprises one or more RANs and one or more CNs. The radio communications network 1 may use a number of different technologies, such as LTE, LTE-Advanced, WCDMA, Global System for Mobile communications/Enhanced Data rate for GSM Evolution (GSM/EDGE), Worldwide Interoperability for Microwave Access (WiMax), WiFi, Code Divisions Multiple Access (CDMA) 2000 or Ultra Mobile Broadband (UMB), just to mention a few possible implementations.

In the radio communications network 1, a user equipment 10, also known as a mobile station and/or a wireless terminal, communicates via a Radio Access Network (RAN) to one or more core networks (CN). It should be understood by the skilled in the art that "user equipment" is a non-limiting term which means any wireless terminal, MTC device or node e.g. Personal Digital Assistant (PDA), laptop, mobile, sensor, relay, mobile tablets or even a small base station communicating within respective cell.

The radio communications network 1 covers a geographical area which is divided into cell areas, e.g. a cell 11 being served by a radio base station 12. The radio base station 12 may also be referred to as a first radio base station. The radio base station 12 may be referred to as e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The radio base station 12 may serve one or more cells, such as the cell 11. The user equipment 10 is served by the radio base station 12.

A cell is a geographical area where radio coverage is provided by the radio base station equipment at a base station site. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole radio communications network 1 is also broadcasted in the cell 11. The radio base station 12 communicates over the air or radio interface operating on radio frequencies with the user equipment 10 within range of the radio base station 12. The user equipment 10 transmits data over the radio interface to the radio base station 12 in Uplink (UL) transmissions and the radio base station 12 transmits data over an air or radio interface to the user equipment 10 in Downlink (DL) transmissions.

Furthermore, the radio communications network 1 comprises a Gate Way node (GW) 13 for connecting to the Core Network (CN).

In some versions of the radio communications network 1, several base stations are typically connected, e.g. by landlines or microwave, to a controller node (not shown), such as a Radio Network Controller (RNC) or a Base Station Controller (BSC), which supervises and coordinates various activities of the plural base stations connected thereto. The RNCs are typically connected to one or more core networks.

Embodiments herein fall into the drop precedence marking category of solutions for defining and signaling desired resource demands to a bottleneck in the radio communications network 1. A transmitting node, such as the GW 13 or similar, assigns and marks a value, also denoted as per-packet value, on each packet. The value reflects the importance of the packet for the operator in a linear scale wherein the value corresponds to a level of importance along the linear scale. The value indicates a level of importance of the packet relative importance of another packet. For example, the value '1000' indicates that the packet is 100 times as important as a packet with the value '10' and 10 times as important as a packet with value '100'. The importance may be determined based on the actual contents of the packet payload, e.g. important video frame, or based on the specific packet flow, e.g. premium traffic of gold subscriber, or based on throughput commitments, e.g. whether or not this packet is needed to reach a certain level of throughput, or a combination of these, or any other, criteria.

The value assigned to each packet, also referred to as a per packet value, is a scalar value and enables nodes to perform computations on these values, such as sum the values for a total value or divide the values to reflect higher cost of transmission. Also such values not only express which packet is more important, but also by how much. This is in contrast to existing drop precedence markings, which simply define categories of drop levels, where the individual drop level categories are merely ordered, but further relation among them is not expressed. The whole packet has the same value, but the representation of the value may be a value of a single bit of that packet. The value marked for the packet may e.g. be the value of the single bit times bit length. The coding of the value may be linear, logarithmic or based on e.g. a pre-communicated table.

The packet is transmitted to a receiving node, such as the radio base station 12 or similar, which reads the value of the packet and handles the packet based on the value and expected resources needed to serve the packet. For example, the receiving node may comprise a resource allocation scheme. The resource allocation scheme that works on these marked values aims to maximize a realized value, may also be referred to as a realized operator value, of served packets over a bottleneck. For this, it takes into account both the value indicating the per-packet value, and the expected amount of resources to serve the given packet. Therefore packets with e.g. different amount of expected radio channel overhead may also be compared and precedence among them may be established based on the realized value per radio resource unit.

In this way, embodiments herein use a kind of marking for drop precedence, such that the marking not only defines the relative drop precedence of packets compared to each other in case of equal resource demand, but it also gives a value by which the resources needed, e.g. different radio channel overheads, can be taken into account and a precedence can be established between packets with different radio channels.

As an alternative to taking into account the amount of radio resources, different resources e.g. packet overhead at lower layers or processing cost can be taken into account similarly.

Thus, embodiments herein take the importance as well as the expected resources needed to serve the packet into account when handling the packet. For example, the radio channel overhead, also known as user specific radio channel quality, may be taken into account. As long as the radio channel overhead is the same for all packets, a large number of drop precedence levels are suitable to describe a large variety of target resource sharing policies. However, as soon as the radio channel overhead is different for the packets, the interpretation of drop precedence is limiting the richness of the resource sharing policies. Herein, embodiments enable the determining of e.g. the resource sharing between a packet with a higher drop precedence but requiring a small amount of radio resources to serve and a packet with lower drop precedence but taking much more radio resource to serve. This is a flexible way of handling packets in an efficient manner.

Figure 2:
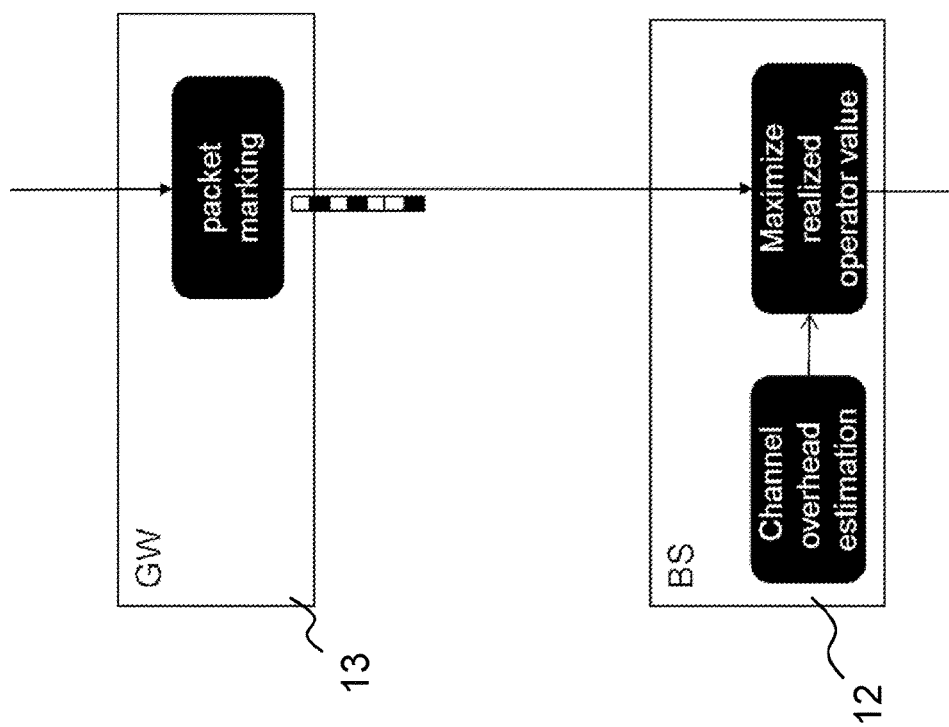
FIG. 2 shows a block diagram depicting a packet transmission according to embodiments herein.

Embodiments herein may comprise the following elements, as illustrated in FIG. 2, wherein a solution for a downlink direction is described. Typically, the solution would be used in the downlink only; even though an extension for uplink is also possible in case the packet marking can be performed before the bottleneck. The uplink direction is more difficult, because the user equipments typically cannot easily be configured to perform such a marking in a reliable way but the embodiments herein may be implemented in the UL, i.e. the transmitting node is the user equipment 10 or the radio base station 13 and the receiving node may be the radio base station 12 or the GW 13. However, in the illustrated examples herein the transmitting node is the GW 13 and the receiving node is the radio base station 12.

In FIG. 2 the GW 13 with a packet marking function is shown. The packet marking function adds or modifies a packet header to indicate the value of the bits of the packet for the operator. It may be possible to omit the marking on certain packets in case the marking could be inferred in some way, e.g. when the marking is identical in subsequent packets. Here we assume that the value V corresponds to the value of a single bit in the packet, such that a total value of the packet is VL where L is the bit length of the packet. Alternatively, it is also possible to mark the total value of the full packet as the value.

The packets are sent with their marked value to the radio base station 12. These values or markings serve to describe the intended resource sharing for different possible congestion levels.

The radio base station 12 includes a channel overhead estimation function which uses feedback from a link quality report in e.g. a form of channel quality reports, Radio Link Control (RLC) feedback, Hybrid Automatic Repeat Request (HARQ) feedback, and also uses the current coding and modulation configuration to assess the amount of resources expected for delivering data on a given radio bearer. The estimation results in determining a value of 'r', which 'r' indicates the amount of radio resources required or needed to send a single bit on the given radio bearer. The type of radio resources included in the calculation may differ depending on the radio technology, and may include for example a combination of time, frequency or power resources.

Based on the resources needed, e.g. expected channel overhead, indicated by 'r' and the marked value on the packets, a resource sharing algorithm in the radio base station 12 tries to maximize a realized value. In case of a packet marked with value V and length L, with a channel of 'r' radio resources per bit, the realized total value by serving the whole packet is VL, and the realized value per radio resource unit is V/r. Therefore, to maximize the value served over the limited amount of radio resource, the resource sharing mechanism gives preference to serve packets with higher V/r value, and gives higher drop precedence to packets with lower V/r value.

Packet Marking

There are a number of ways to determine the packet marking indicating the value of the bit or bits in the packet. The following criteria, or a combination of them, could be used.

Base the packet marking on the actual contents of the packet. For example:
  Some packets in a video stream may be regarded as more important than other packets, carrying basic frame information, or the highest priority layer in case of layered video.
  Transport Control Protocol (TCP) SYN packets may be regarded as more important since they are the initial packets and associated with a longer retransmission timeout than regular packets and hence should not be dropped.
  Domain Name System (DNS) packets may be regarded as more important to avoid packet drops of these and speed up the time required to e.g., display a web page.
Base the packet marking on additional information such as the subscriber type, e.g., gold, silver or bronze subscription, or the type of flow which the packet is part of, which can be derived by packet inspection. E.g., packets of a voice call may get a higher value to avoid dropping these packets compared to video of the call.
The throughput of a given traffic aggregate. The operator may set different values depending on the actual throughput. For example, the initial X kbps packets may get a very high value, the additional Y kbps packets may get a lower value, and the extra packets above the X+Y kbps may get an even lower value. Needless to say that the number of throughput levels to consider may be increased arbitrarily if required. Usually, the value of additional packets decreases with the total throughput, which corresponds to the general judgment of users that the value of additional Z kbps throughput decreases as the total throughput increases.

This type of throughput based marking may be performed by e.g. introducing a number of token buckets, with their rates corresponding to the threshold throughput levels, and testing which is the token bucket with the smallest rate which the packet would fit into.

Figure 3:
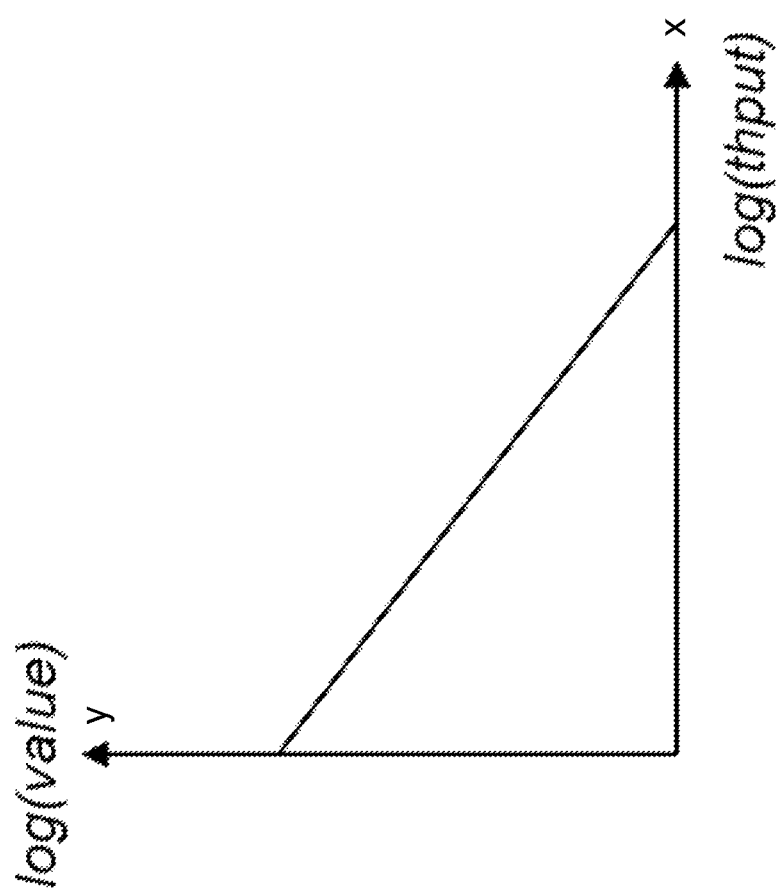
FIG. 3 shows a graph depicting throughput as a function of the value.

Theoretically, the number of throughput levels can be increased to infinity, and the value to set for a given throughput can be based on a value curve that is defined as a function of the throughput. FIG. 3 shows an example of such a curve where the packet value is a linearly decreasing function of the throughput, where both the value, along an y-axis, and the throughput, along an x-axis, are plotted on logarithmic scale.

This curve can be interpreted as if we were performing a measurement of the packet stream on all possible throughput levels. The throughput value that we associate with a packet is the lowest throughput level which the packet fits in. A continuous curve can be approximated by a number of discrete throughput values, such that we can associate a token bucket with each throughput value.

Example Packet Marking Schemes

Figure 4:
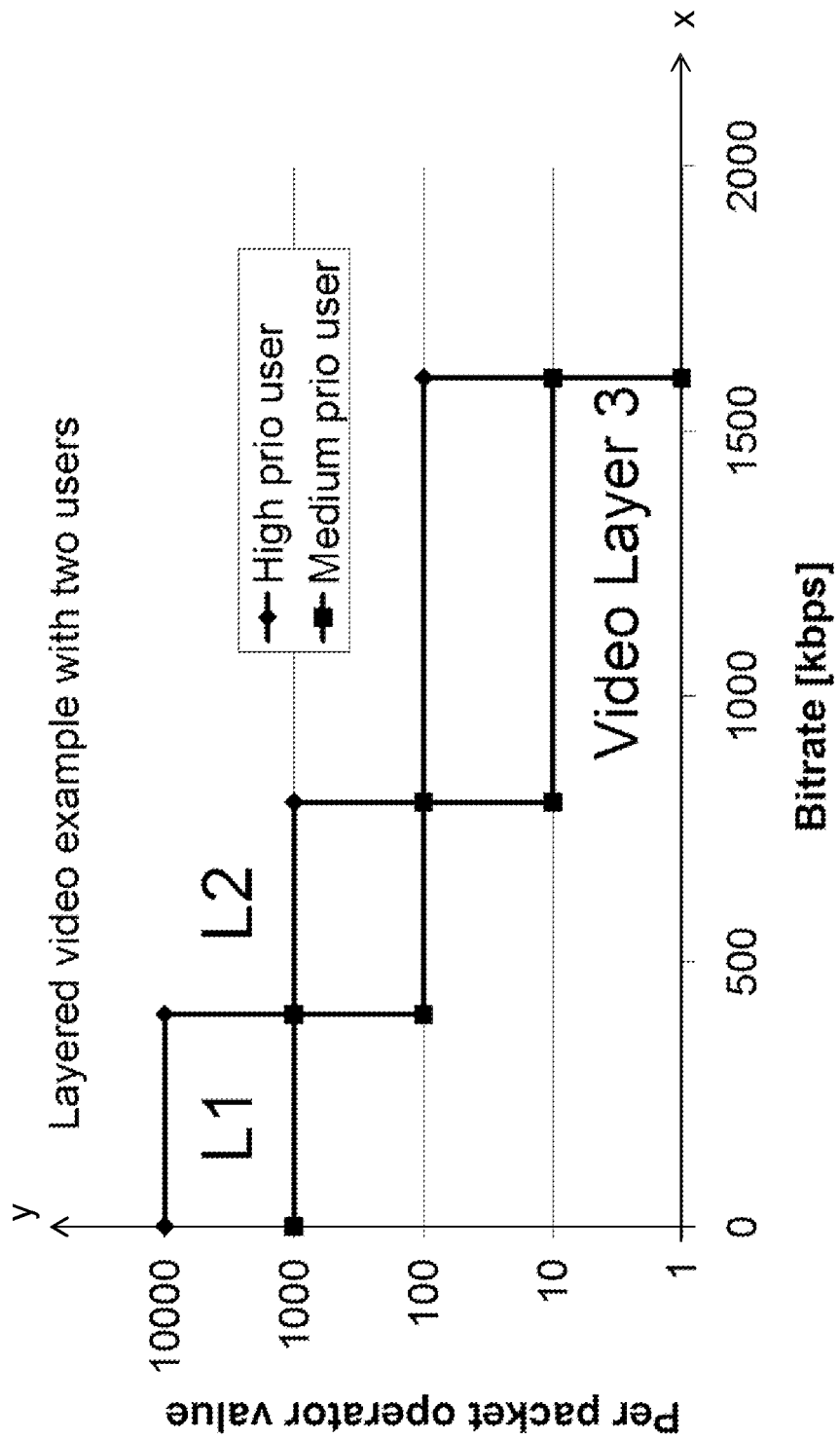
FIG. 4 shows a graph depicting packet value as a function of the throughput.

An example value curve for fixed rate layered video is given in this section. FIG. 4 depicts two value curves: one for high prio and the other for medium prio users. The curves show how much of the traffic shall be marked with a given value at e.g. the gateway 13. The value is defined along a y-axis and bitrate is defined along an x-axis. For example, the top curve for the high prioritized user equipment (user) in the FIG. 4 defines that if the incoming traffic is less than 400 kbps, all of it shall be marked with value=10000. If it is more than 400 kbps, then 400 kbps of it shall be marked with value=10000, and the rest (up to another 400 kbps) with value=1000. If the traffic is higher than 800 kbps, then besides 400 kbps of value=10000 and another 400 kbps of value=1000, the rest (up to another 800 kbps) shall be marked shall be marked with value=100. Finally, If there is more than 1600 kbps of traffic, the volume above 1600 kbps shall be marked with value=1. These curves can be implemented by, for example, a series of token buckets of respective speeds.

In the description above the marking of the packets is solely based on traffic volume and no distinction is made between L1, L2 and L3 video packets—any of them can get any of the 10000, 1000 or 100 value marking. To better prioritize between layers, the selection of values for a given packet can be influenced by Deep Packet Inspection (DPI). Specifically, the value can be set to reflect the layer of the video: basic layers can get higher value, whereas enhancement layers can have lower value. This ensures that packets of an enhancement layer are delivered only if all packets of previous layers can also be delivered.

In the example, Layer 1 (L1) video packets of high prio users have 10 times higher value than L1 packets of medium prio users. This means that L1 packets of the high prio users are prioritized compared to L1 packets of medium prio users as long as serving these high prio packets takes less than 10 times more resources compared to serving these medium priority packets. E.g., in the case when the resource demand of serving an octet is the same for a high and a medium prio user L2 packets of a high priority user are equally important to the L1 packets of a medium priority user.

If the above fixed bitrate layered video is replaced with Variable Bit Rate (VBR) layered video then the same values may be used for the different layers, though the curve becomes dynamic in the bitrate domain. The desired resource sharing behavior can equally well be reached in this case. Note that both for the constant bitrate and the variable bitrate layered video, DPI is needed to be able to identify and mark packets of different layers accordingly, e.g. to avoid that a L2 packet is marked according to L1 value.

Figure 5:
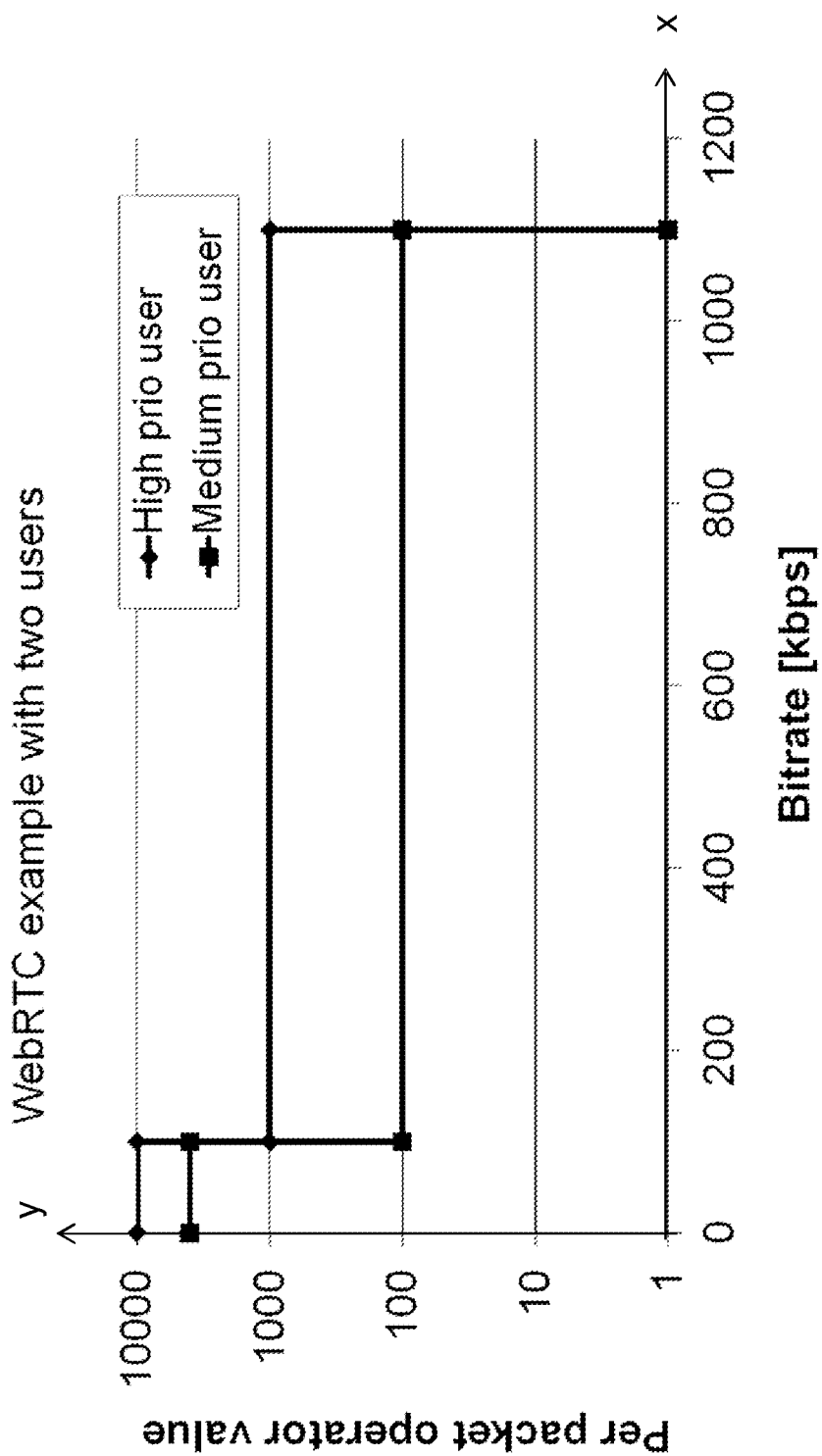
FIG. 5 shows a graph depicting packet value as a function of the throughput.

Another example where different media contents are included in the same service is a video call session over web with Real Time Communication (WebRTC). In this case when there are not enough resources it is advantageous to transmit the voice part of the session. FIG. 5 depicts the value as a possible Per Packet Operator Value (PPOV) setting along a y-axis for such a scenario for a high and a medium priority user at e.g. the GW 13. The bitrate is defined along an x-axis. Both the voice stream, 0 to 100 kbps part, and the video stream, 100 to 1100 kbps, of the high priority user have higher PPOV than that of the medium prio user. However the voice part of the medium prio user has higher PPOV. In this way normally the voice part of the medium prio user can be transmitted even when the video part of the high prio user cannot fit into the system. Of course, at marking DPI is advantageous to mark the actual voice and video packets accordingly.

Figure 6:
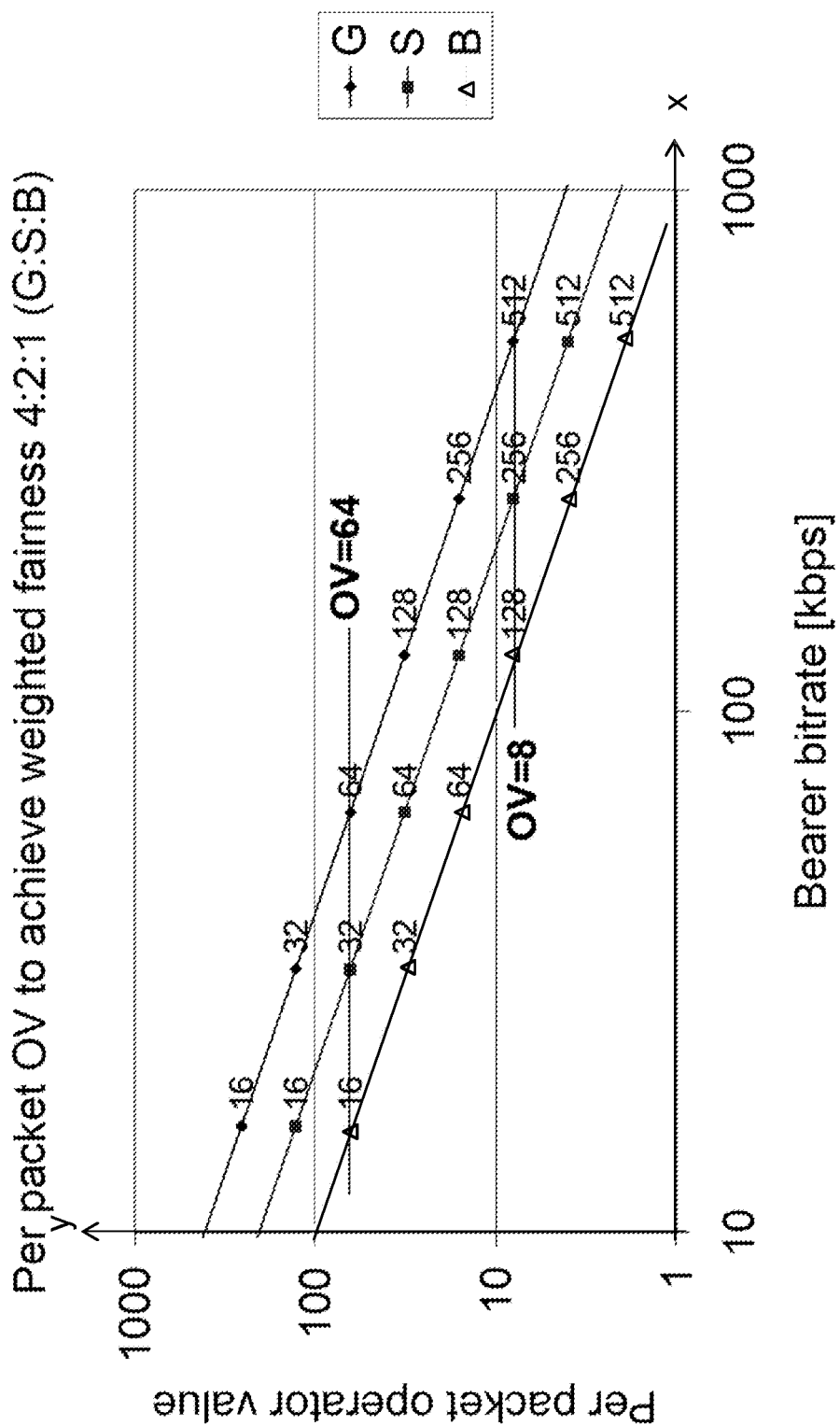
FIG. 6 shows packet value curves to achieve weighted fairness among flows of different priority.

In another example, FIG. 6 depicts value curves, may also be referred to as per packet value curves, to achieve weighted fairness among flows of different priority (log-log scale) at e.g. the radio base station 12. Y-axis defines the value and the x-axis defines the bitrate. In this example three different best effort classes are defined Gold (G), Silver (S) and Bronze (B). The target resource sharing among these classes is according to weights 4:2:1. In the FIG. 6 bitrate values for selected bearer bitrates are indicated. The FIG. 6 illustrates how different value limits lead to weighted sharing 4:2:1 among these flows. The value limits 64 and 8 are marked with horizontal lines, it is possible to see that in case of value limit 64 the bearers achieve 64, 32 and 16 kbps while in case of value limit 8 the bearers achieve 512, 256 and 128 kbps.

Figure 7:
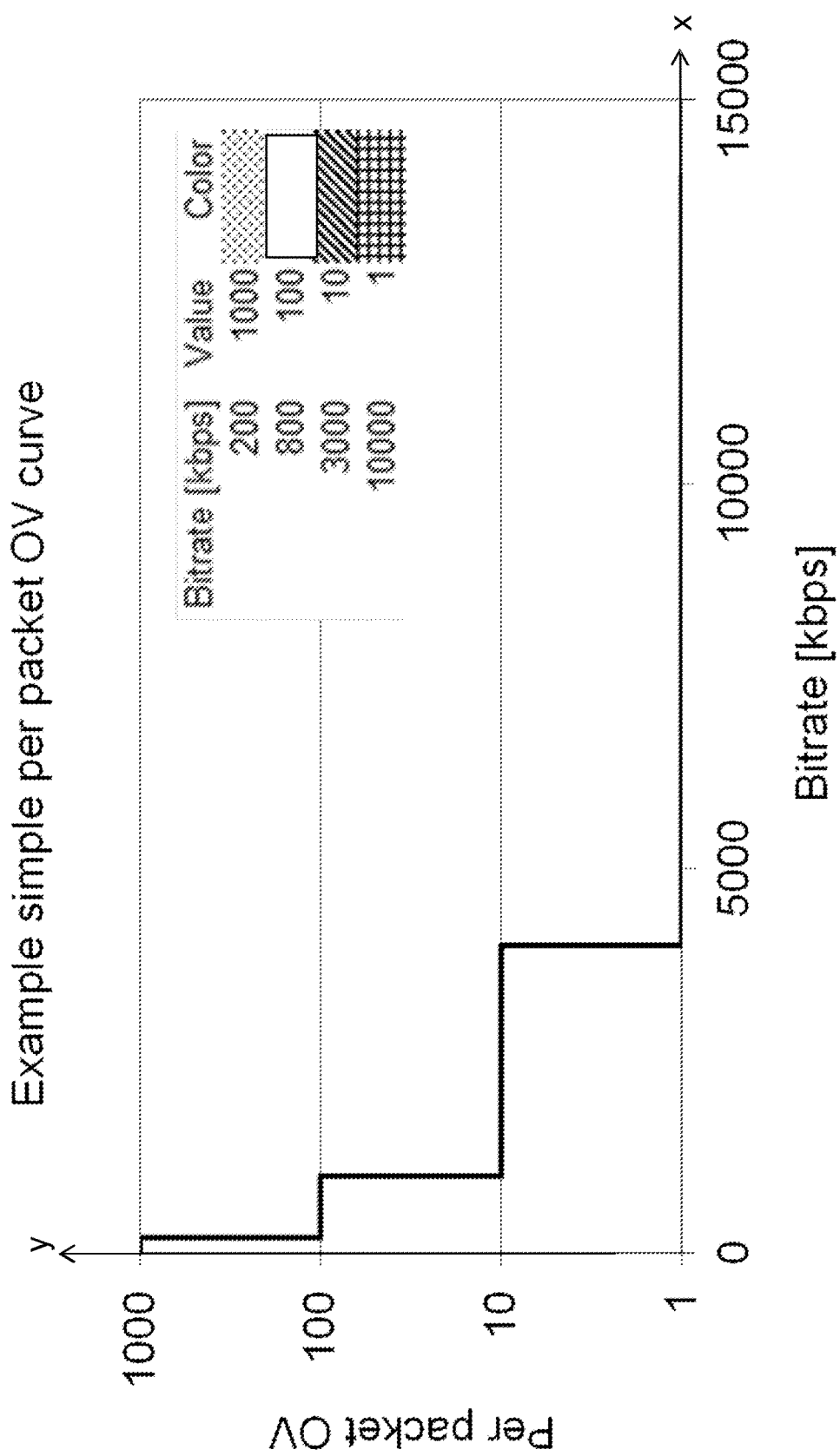
FIG. 7 shows a graph depicting packet value as a function of the throughput.

Note that in case of the above marking scheme the packets with various values are mixed in any packet flow. To explain and illustrate this effect, FIG. 7 depicts a simpler per packet value curve, which can be implemented using 4 token buckets at the GW 13. The value is defined along a y-axis and bitrate is defined along an x-axis. Also a marking rule is to always take tokens from the bucket which has the highest value associated with it, and has enough tokens—at least equal to the packet length. A first bucket of value 1000 wherein the value 1000 is added to packets, marked with a dotted pattern, up to 200 kbps. A second bucket of value 100 wherein the value 100 is added to packets, marked with as white packets, from 200 kbps to 800 kbps. A third bucket of value 10 wherein the value 10 is added to packets, marked with a diagonal striped pattern, from 800 kbps to 3000 kbps. Finally, a fourth bucket of value 1 wherein the value 1 is added to packets, marked with a squared pattern, above 3000 kbps.

Figure 8:
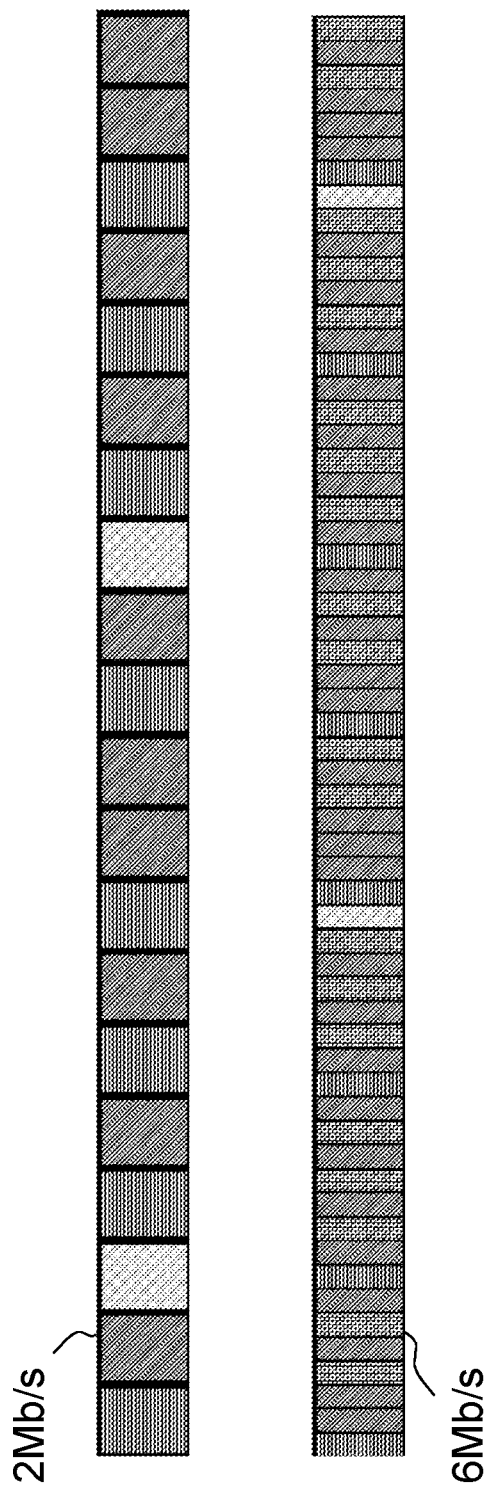
FIG. 8 shows different packet of the same flows carrying different values.

FIG. 8 depicts the value associated with packets of a 2 Mbit/s flow and a 6 Mbit/s flow if we apply the value curve to them. It illustrates how the different packets of the same flow carry different values, illustrated with the different patterns, to achieve the desired resource sharing. The flows in this example have different arrival rates, and the packets of a flow arrive periodically, same time interval between all two consecutive packets. The 2 Mbps is the one having less packets on the FIG. 8, the horizontal line being time. All rectangles mean a packet of the same size, i.e. a packet of the 2 Mbps is the same size as a packet of the 6 Mbps. Also it can be seen in FIG. 8 that within the same time interval there is the same amount of highest value packets.

Header Field Options

There are a number of options for carrying the value in various header fields. The options include:
   Use the General Packet Radio Services (GPRS) Tunneling Protocol User Plane (GTP-U) header
   New field, standardized or proprietary
   Replacing sequence number field
   IPv6 header option
   DiffServ codepoint (DSCP)
   A new field in a Spare Extension field of High Speed Downlink Shared Channel (HS-DSCH) DATA FRAME Resource Sharing in the Receiving Node As noted earlier, resource sharing e.g. in the radio base station 12, aims to maximize the realized value. The radio base station 12 resource sharing function needs to find a threshold value, which may of course change over time, above which the packets are let through, and the packets below the threshold value are dropped, in case of congestion. In the case the packet value markings are defined by throughput curves, as exemplified above, then the resource sharing can be interpreted as drawing a horizontal line for a value threshold, such that the throughput values are defined by the intersection of the value threshold with the throughput curves. The value threshold needs to be determined such that the available capacity is fully utilized, and the additional traffic above the capacity does not suffer significant delays.

In the case of a radio channel, the radio resources required to transmit a bit may vary significantly depending on the applied channel coding, modulation, number of retransmissions, power levels, etc. The amount of radio resources required to transmit a bit may be quantified by 'r'. This also has an effect on the value of the packets compared to the available radio resources if the packet is served. When the value of a packet is V, and the channel of the given user is quantified by r, then the packet yields a realized value of V/r over a radio resource unit. As the aim of the resource sharing may be to maximize the realized value over the available radio resources, the resource sharing prioritizes the packets where the V/r ratio is the highest. The V/r ratio is termed an effective value of the packet or the realized value of the packet, since this gives the value that is effectively realized per radio resource unit when the packet is scheduled.

In order to determine 'r', an estimation for the expected value of 'r' may be performed when the packet is scheduled. This can be realized through channel quality indicators, HARQ feedback and/or RLC received from the terminal.

Figure 9:
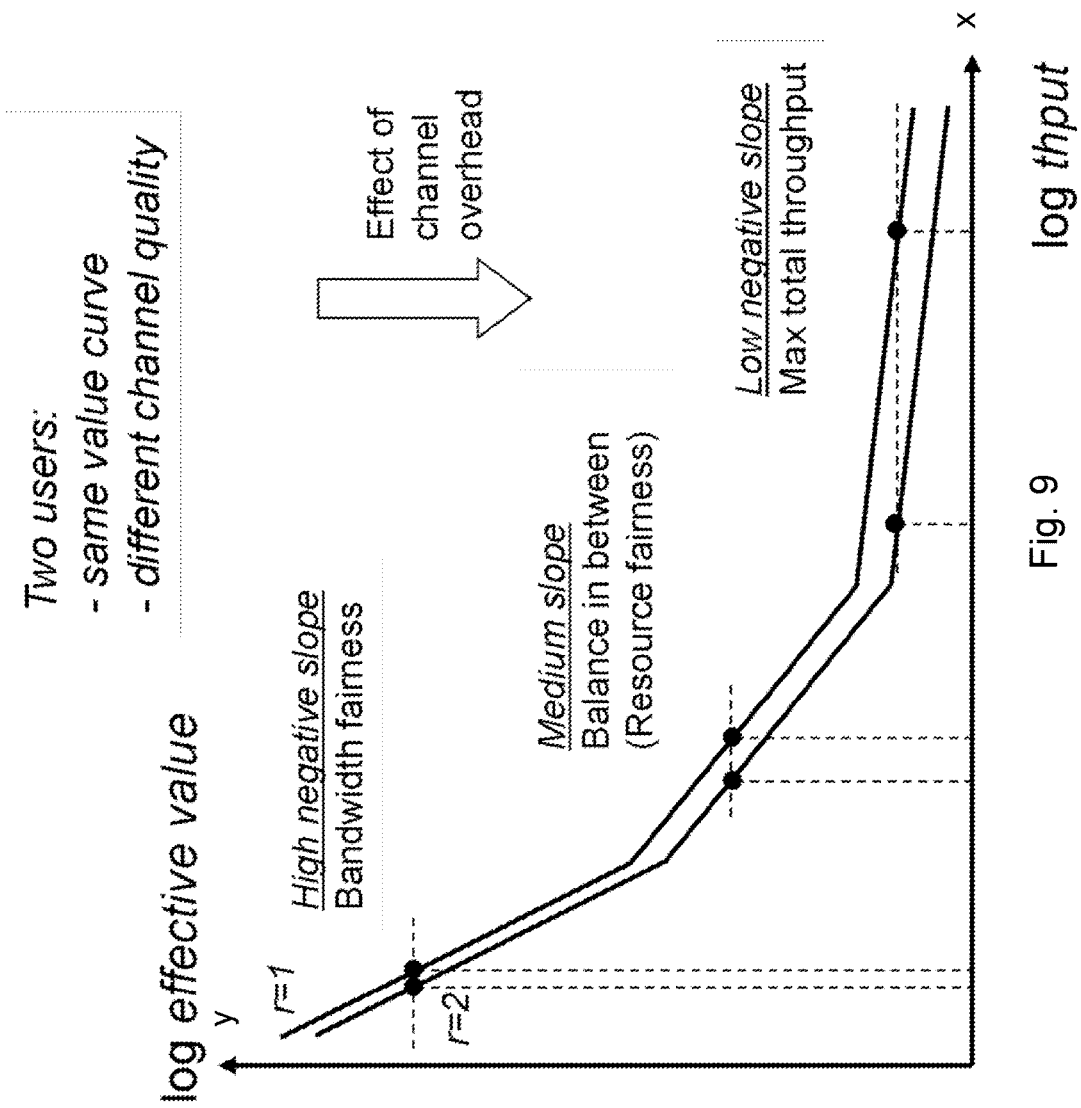
FIG. 9 shows a graph depicting packet value defined by a value curve as a function of throughput.

FIG. 9 illustrates the effect of the channel overhead in case the packet marking is defined by an effective value curve as a function of the throughput. The effective value is defined along a y-axis and the throughput is defined along an x-axis.

Two user equipments have same value curves as a function of the throughput. However, a first user equipment has a better channel with r=1, the top curve, and a second user equipment has twice as much radio overhead with r=2. This causes the effective value to move downwards in the FIG. 9, leading to two different effective value curves. The effect on the actual throughput depends on the slope of the curve.

In case the curve has a high negative slope at a given level of congestion, this results in a resource sharing where the two user equipments get nearly the same throughput. Hence, the bandwidth fairness is not significantly modified by the radio channel conditions. This can reduce the cell throughput, as a user equipment with worse channel can get more resources than another user equipment with better channel, but the bandwidth fairness is better.
   In case the curve has a low negative slope at a given level of congestion, the resource sharing is significantly modified by the channel conditions. A user equipment with worse channel gets significantly less resources. Hence this is close to the max total throughput resource sharing that maximization the throughput utilization of the cell, without trying to provide throughput fairness between the user equipments.

In case the curve has a medium negative slope, this yields a balance in between, with a degree of throughput fairness and a medium level of throughput utilization.

The slope of the value curve can influence the bandwidth fairness as well as the bandwidth utilization of the resource sharing at the receiving node. By choosing the intended value curve, the fairness-utilization trade-off on a per service basis may be influenced, and dependent on the experienced quality of that service.

An Example Resource Sharing Solution, Drop Precedence Based

Above it has been discussed how packet marking may be performed to set the value of the packets, and how the radio channel overhead may be incorporated to maximize the realized value. The resource sharing may need to prioritize the packets with higher effective value, where the effective value may be derived as V/r, where V is the packet value, and 'r' is the expected resource usage per bit.

Figure 10:
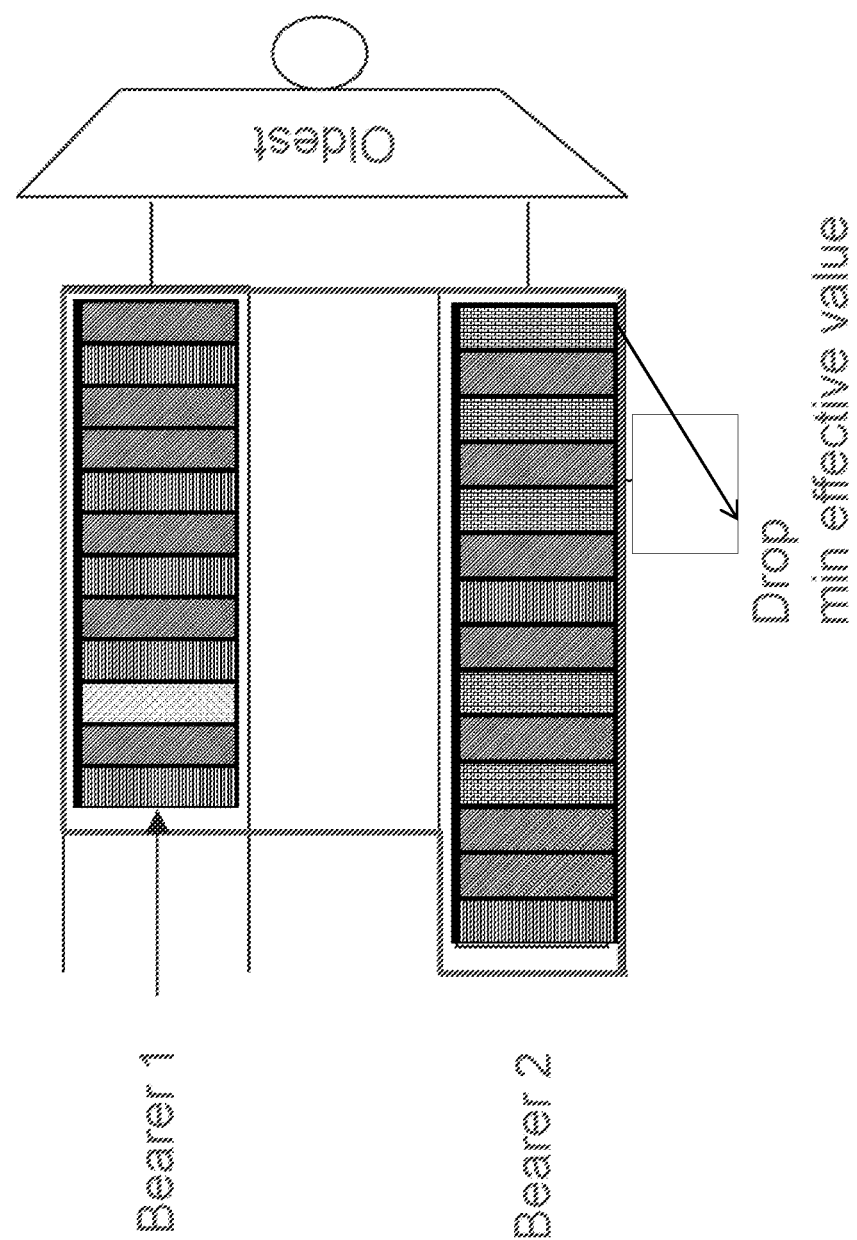
FIG. 10 shows flows with packets of different values.

In a practical resource allocation scheme, embodiments herein provide a solution that ensures the prioritization of the high effective value packets, at the same time the packet ordering of packets on a single bearer needs to be kept. There is a need for a practical mechanism for this. FIG. 10 presents one example solution.

The embodiments disclosed herein disclose the following elements:

Packets in each bearer are queued in the receiving node. The scheduler in the receiving node picks the oldest, i.e., earliest arrived, packet. For this purpose, packets may be stamped with their arrival time, or they may be maintained in a global First In First Out (FIFO) queue.

The effective value for each packet is calculated as e.g. V/r, where V is the per packet value marking, and 'r' is the expected channel resource usage per bit on the radio channel of the user equipment 10.

There is a total buffer size defined for all the packets on all user equipments that are queued.

When the total buffer size is reached for an incoming packet, the receiving node drops the packet with the minimal effective value. The receiving node may drop a packet from a queue, or the incoming packet itself. The receiving node may repeat the packet drop until the incoming packet can fit into the buffer below the buffer size, or until the incoming packet is dropped.

The solution keeps packet ordering, as the earlier arrived packets are always served first. The solution also gives priority to packets with higher effective value, as they have a lower priority for being dropped in case of full buffer. Only the packets which have "survived" the buffering and have not been dropped by a higher effective value packet can be served. In this way, the realized value is maximized.

Note that the solution may also be realized on e.g., a transport link, should that become a bottleneck. That is due to the scheduling of the oldest packet, which makes the solution easy to realize by a single FIFO queue. The use of a single FIFO queue does not impact the solution otherwise. For a transport link, the resource usage would be the same for all users, hence the value of 'r' would not need to be taken into account, and the solution can work with the packet values rather than the effective packet values. The use of a single FIFO queue is especially beneficial as transport equipment typically cannot differentiate user equipments or flows into different queues.

Using the packet dropping scheme of "Introducing simple RLC functionality to Node B", PCT/EP2012/004482, this solution is also possible in a WCDMA Node B.

An Example Resource Sharing Solution, Value Based.

A different way to schedule packets could be at each time instant to select the packet(s) for service which have the highest V/r. Note that this is the same as selecting the packets which realize the highest amount of total VL for a given scheduling unit. V may define Currency/bit; L defines number of bits; 'r' defines a resource demand per bit and VL may define Currency realized by a whole packet. V/r is the realized value per radio resource unit.

In this case packet drop can be based on time stamps, all packets which are older than a given limit may be dropped.

If the flows require in-order delivery then a re-ordering function will be needed in this case at the receiving node. This function works by re-ordering the packets in a receiver buffer using sequence number, which are appended to the packet at the receiving node. This is not needed if the flows can tolerate out-of-order delivery.

Some Advantages of Embodiments Herein

Embodiments herein enable a conceptually simple, consistent, highly dynamic and comprehensive marking and resource sharing framework to convey a wide range of desired resource sharing policies to a bottleneck. The solution is made possible by taking into account the amount of resource usage when making resource sharing decisions. This enables the Quality of Experience (QoE) aware resource sharing over the bottleneck, e.g. air interface, where the solution aims to maximize the realized value. The QoE needs of individual user equipments and the preferred services are taken into account during the realized resource sharing.

In mobile networks, the approach is in-line with current CN-RAN functional split, where the CN makes service policy decisions and the RAN implements resource management and scheduling. In most cases there is no need to provide any feedback from RAN to CN about congestion, appropriate marking will result in the required resource sharing behavior under all load scenarios. However, if feedback is needed, e.g. to be used as a performance indicator to quantify the level of congestion, it can come in a single consistent value per traffic aggregate. That value can be the threshold packet value for which all packets with higher value were served from the given traffic aggregate. Knowing the marking rules of the traffic aggregate the experienced quality can be determined.

The resource sharing is flow independent, which has multiple benefits. Note that to differentiate between flows marking still needs to be done to be flow aware, but not at the actual bottleneck. It also becomes possible to aggregate traffic from different markers over the same bottleneck. First, resource sharing mechanisms need no concept of a flow, which makes it possible to operate over aggregates without flow information. In this way, the solution can realize the intended resource sharing target not only on the air interface, where often per traffic aggregate buffering is possible, but also in the transport, should that be a bottleneck. Second, it becomes possible to differentiate sub flows within a flow without additional signaling. Hence, the transmitting node marks packet on a per flow but the receiving node handles the packets without reading at the flow markings.

Figure 11:
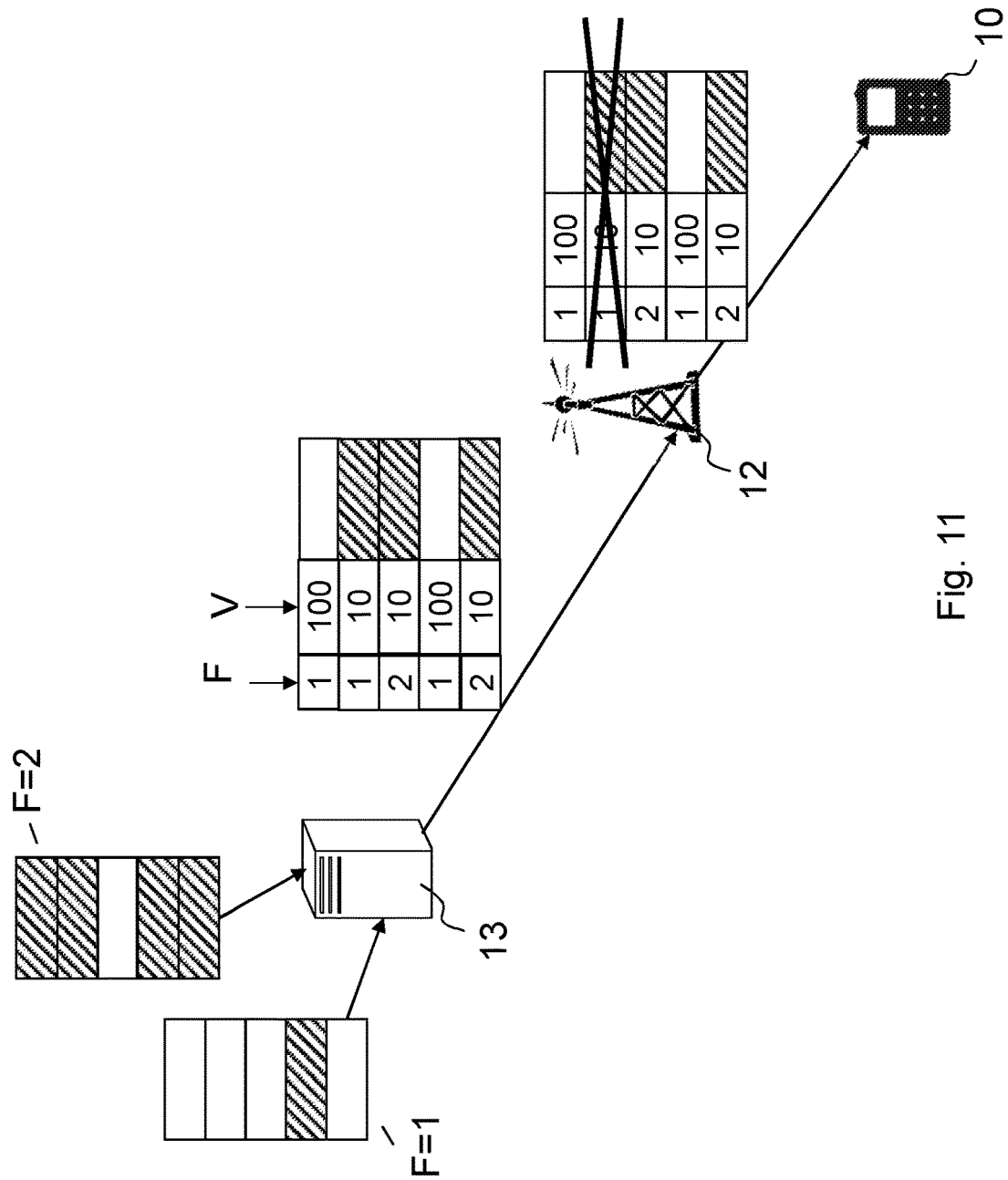
FIG. 11 shows schematic overview of a radio communications network according to some embodiments herein.

FIG. 11 discloses an embodiment wherein the GW 13 receives two packet flows, a first flow indicated by white packets in the figure and a second flow indicated by packets with a diagonal pattern. The GW 13 marks the packets of the flows with a flow ID F and the value V indicating the importance of the packet. As seen the packets of the flows have different values, e.g. being voice and video. E.g. first flow, F=1, being of a higher priority user, comprises four '100' value packets and one '10' value packet, and a second flow, F=2, being of a lower priority user, comprises four '10' value packets and one '100' value packet. The packets are then transmitted to the radio base station 12. At the radio base station 12 a congestion, a bottleneck situation, has occurred, and a packet with value '100' arrives. The radio base station 12 then initiates a dropping process. The radio base station 12 checks the realized value of the packets and for that the radio base station 12 checks the amount of resources needed for serving the flows e.g. the resources needed for the first flow is half the amount of the resources needed for the second flow. The radio base station 12 then drops the last packet received of the first flow having the lowest realized value, in the illustrated example a packet of value 10 of F=1. Please also note that even though flow identification at the bottleneck is not needed, however in a practical implementation over the air interface there is per UE queuing, because the common thing in all packets of the user equipment 10 is that they all take the same amount of resources to serve. This, per UE queuing, is not needed e.g. over transport network links, because all packets take the same amount of resources to serve over the transport network link. Still flow knowledge within UE, over air, or within TN link is not necessary.

Embodiments herein allow both differentiating packets and controlling resource sharing within bearers and among bearers with a single mechanism. That is, it is easy and natural to up-prioritize a sub-flow of a bearer or the first few packets of a flow. Differentiation is equally simple for best-effort and special traffic, even within a single bearer. In addition, other cases, such as giving priority to the first layer of videos for all users over their other traffic are also easy to realize.

It supports a wide range of resource sharing policies, but fits QoE related policies especially well, when we focus on the value of each traffic piece to the user equipment 10. Even handling for single packets can be defined, e.g. up-prioritize TCP start-up or ping. Since the resource sharing is defined by the packet marking, avoiding any impact or reconfiguration in the RAN, this can be especially easy to set up or reconfigure. In this way, the solution is extremely scalable and flexible in terms of setting up lots of different policies for the operator. Even on-the-fly reconfiguration of marking policies is possible, based on traffic measurements or analytics.

One option to define the packet values is to base it on the throughput of a given flow. The resource sharing can be described by the throughput-value curve. This allows an easy to understand visual representation of the resource sharing for a wide range of congestion levels. In addition, the slope of the curves determines the trade-off between throughput fairness and bandwidth utilization of the resource sharing in case of varying radio channel conditions. By choosing the intended value curve, the fairness-utilization trade-off may be influenced on a per service basis, and also dependent on the experienced service quality.

In addition to resource sharing over the air interface, the framework may be used to share many type of scarce resource. Possible examples are: buffer memory, packet processing resources.

Figure 12:
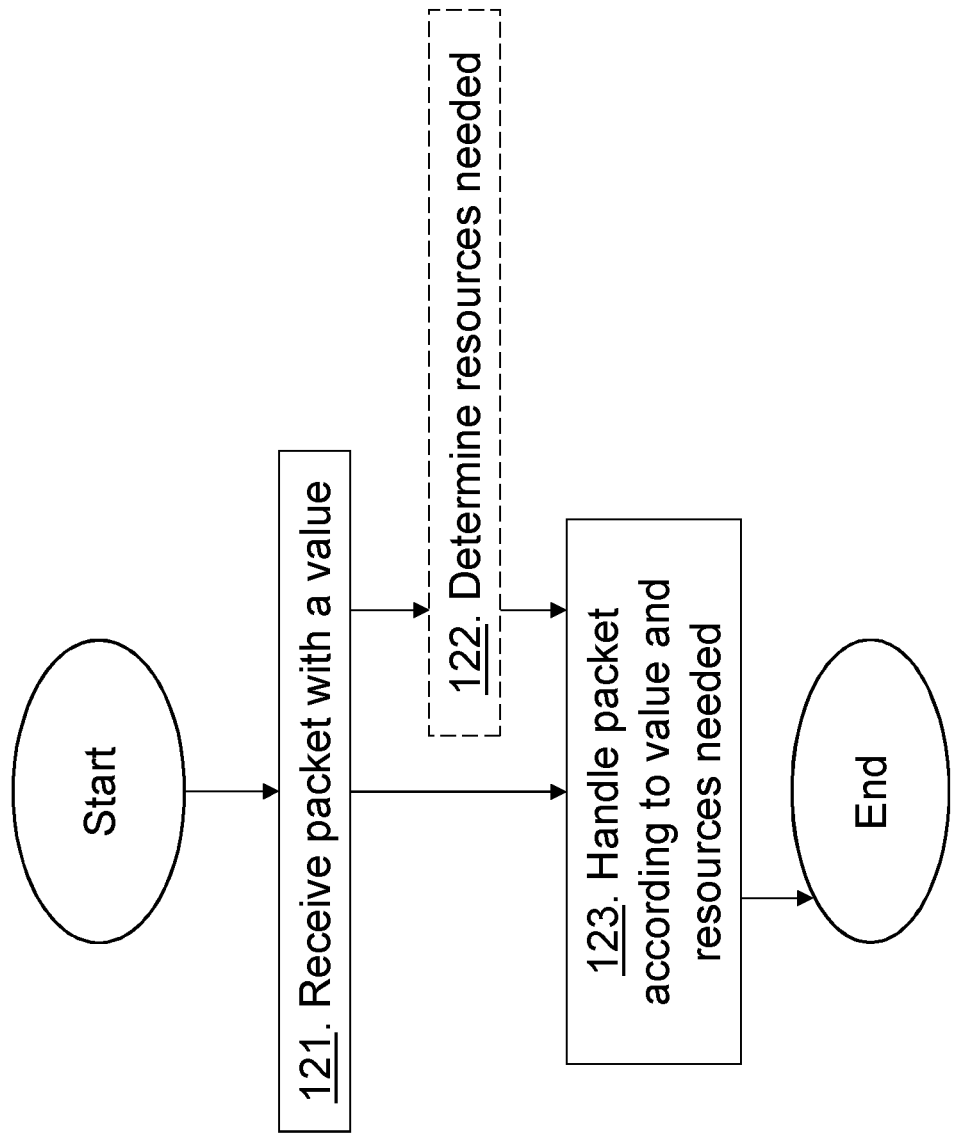
FIG. 12 shows a schematic flow chart depicting a method in a transmitting node.

The method actions in the receiving node, referred to as the radio base station 12 in the figures, for handling packets according to some embodiments will now be described with reference to a flowchart depicted in FIG. 12. The actions do not have to be taken in the order stated below, but may be taken in any suitable order. Actions performed in some embodiments are marked with dashed boxes.

Action 121. The receiving node receives the packet from the transmitting node. The packet is marked with the value, wherein the value is corresponding to a level of importance of the packet along a linear scale.

Action 122. The receiving node may determine the expected amount of resources required to send a single bit on a radio bearer or radio channel.

Action 123. The receiving node then handles the packet based on the value and the expected amount of resources needed to serve the packet. For example, the handling such as scheduling, dropping or similar is based on the value divided with the expected amount of resources resulting in a realized value. In some embodiments the handling comprises to maximize the realized value of served packets over a bottleneck. The resources comprise radio resources, packet overhead at lower layers, or processing cost. A bit of the packet may be marked with the value and the handling is taking an amount of bits of the packet into account in conjunction with the value of the bit. A total value of the packet, to be taken into account in a resource allocation when handling the packet, is a sum of the values for each bit served.

The receiving node may handle the packet by sharing resources when packet scheduling, packet dropping or a combination of packet scheduling and dropping over a bottleneck resource which aims to maximize the total amount of realized value based on the value. The resource shared may be buffer memory, a processing resource, a transport network link or similar. A radio channel used may be changing dynamically and therefore the estimated resource and also the resulting sharing of the resource may be changing as well.

Figure 13:
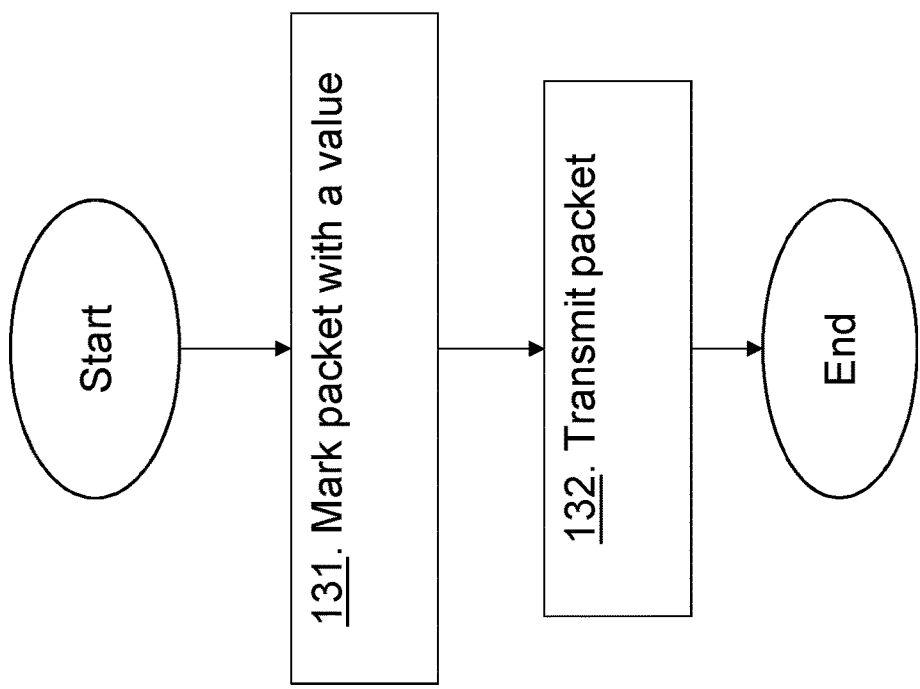
FIG. 13 shows a schematic flow chart depicting a method in a receiving node.

The method actions in the transmitting node, referred to as the GW 13 in the figures, for marking packets according to some embodiments will now be described with reference to a flowchart depicted in FIG. 13.

Action 131. The transmitting node marks one or more packets with a value on each packet, also referred to as per packet value. The value is corresponding to a level of importance of the packet along a linear scale. Hence, the value reflects the importance of the packet for the operator and is a scalar value. For example, the value is a value that corresponds to a value along a scale. The scale defines importance, thus, a linear correspondence is achieved. E.g. the value '10' is one tenth as important as the value '100'. The level of importance may be based on one or more of: contents of the packet payload, a specific type of packet flow, and throughput commitments. The marking may also take the expected amount of resources needed to serve the packet. The value may be a value of one bit or a value of a bit times the number of bits.

Action 132. The transmitting node transmits the marked packet(s) to the receiving node.

Figure 14:
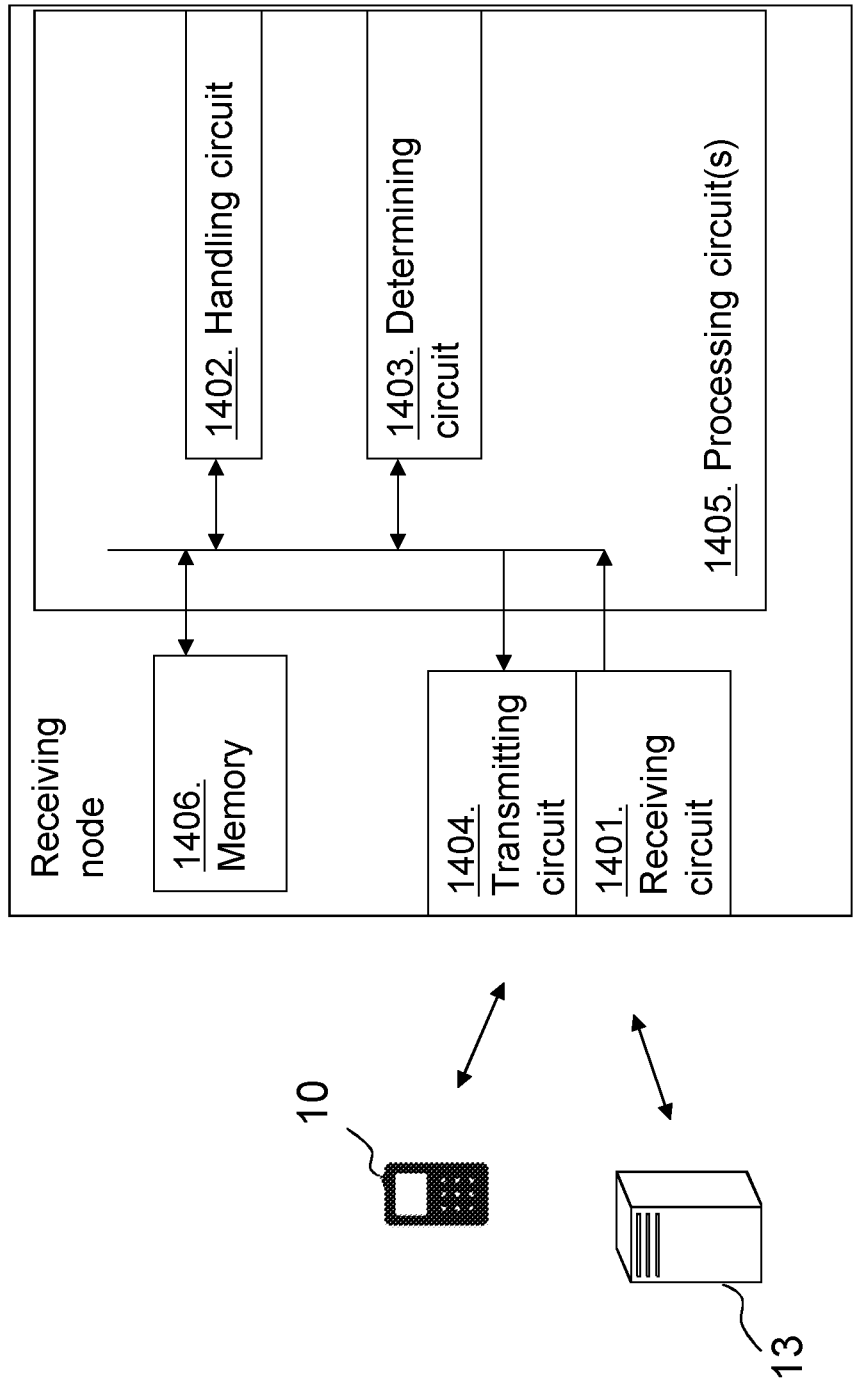
FIG. 14 shows a block diagram depicting a transmitting node.

FIG. 14 is a block diagram depicting a receiving node, exemplified as the radio base station in the figures above, according to embodiments herein. The receiving node for handling packets for the wireless device 10 in the radio communications network 1 comprises a receiving circuit 1401 configured to receive the packet from the transmitting node. As mentioned above, the packet is marked with a value, wherein the value is corresponding to a level of importance of the packet along a linear scale.

The receiving node further comprises a handling circuit 1402 configured to handle the packet based on the value and an expected amount of resources needed to serve the packet. The handling circuit 1402 may be configured to handle the packet based on a realized value, wherein the realized value is the marked value divided with the expected amount of resources. The realized value may also be referred to as an effective packet value. The handling circuit 1402 may further be configured to maximize the realized value of served packets over a bottleneck. In some embodiments may the handling circuit 1402 be configured to share resources when packet scheduling, packet dropping or a combination of packet scheduling and packet dropping over a bottleneck resource which aims to maximize the realized value. The handling circuit 1402 may be configured to share resources when packet scheduling, packet dropping or a combination of packet scheduling and packet dropping, based on the value of the received packet. The resources may comprise radio resources, packet overhead at lower layers, or processing cost. In some embodiments a bit of the packet is marked with the value and the handling circuit 1402 is configured to take an amount of bits of the packet into account in conjunction with the value. The handling circuit 1402 may be configured to take a total value into account in a resource allocation, wherein the total value of the packet is a sum of the values for each bit served. The handling circuit 1402 may comprise a resource sharing scheme, which applies a smaller drop precedence for packets with higher effective packet value; or gives precedence to packets with high effective packet value to be served; or uses a combination of the above, possibly in combination with other dropping and scheduling conditions.

The receiving node may further comprise a determining circuit 1403 configured to determine the expected amount of resource required to send a single bit on a radio bearer. The determining circuit 1403 may comprise a resource estimator for the expected resource usage per transmitted bit.

The receiving node may further comprise a transmitting circuit 1404 configured to transmit the packets according to a scheduling, resource allocation, control signaling back to the transmitting node, or similar.

The embodiments herein for handling packets may be implemented through one or more processors, such as a processing circuit 1405 in the receiving node depicted in FIG. 14, together with computer program code for performing the functions and/or method steps of the embodiments herein. The program code mentioned above may also be provided as a computer program product, for instance in the form of a data carrier carrying computer program code for performing embodiments herein when being loaded into the receiving node. One such carrier may be in the form of a CD ROM disc. It is however feasible with other data carriers such as a memory stick. The computer program code may furthermore be provided as pure program code on a server and downloaded to the receiving node.

Those skilled in the art will also appreciate that the various "circuits" described may refer to a combination of analogue and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The receiving node further comprises a memory 1406 that may comprise one or more memory units and may be used to store for example data such as values, expected amount of resources needed to serve a packet, channel/bearer information, applications to perform the methods herein when being executed on the receiving node or similar.

Figure 15:
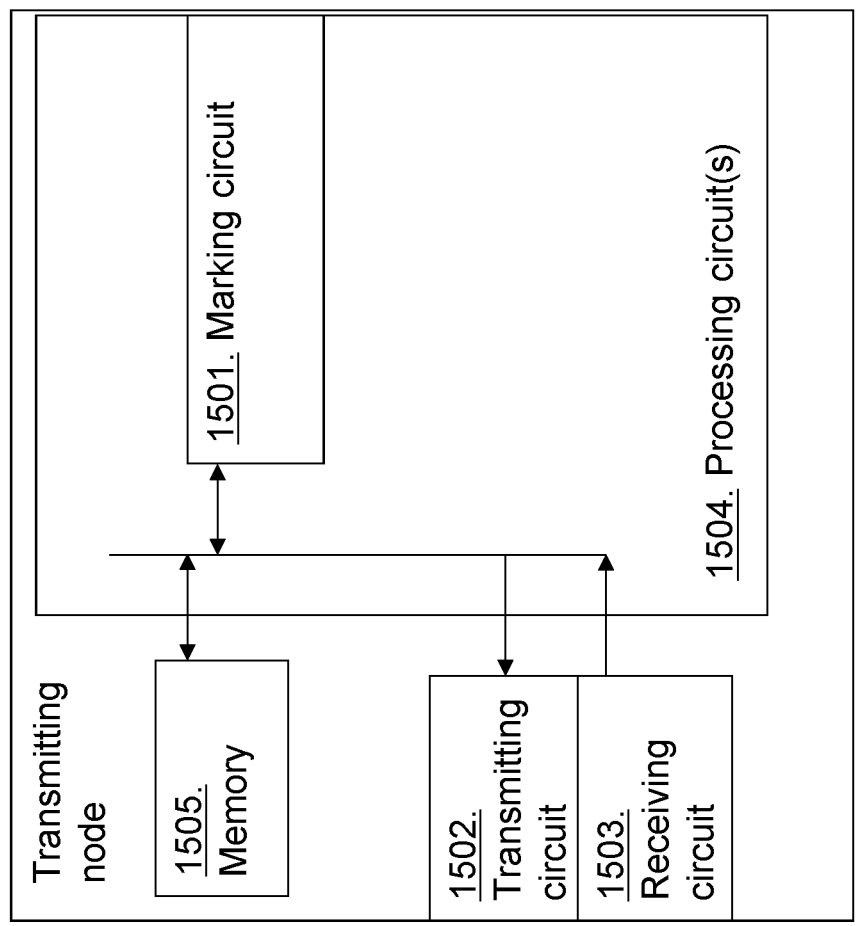
FIG. 15 shows a block diagram depicting a receiving node.
Figure 15:
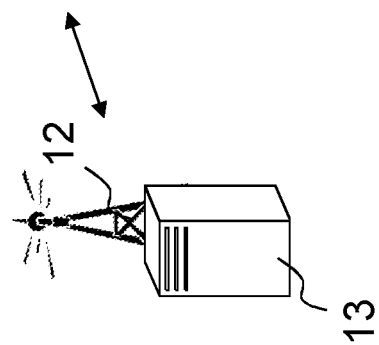

FIG. 15 is a block diagram depicting a transmitting node, exemplified above as the GW 13, according to embodiments herein. The transmitting node for handling packets for the wireless device 10 in the radio communications network 1 comprises a marking circuit 1501 configured to mark a packet with a value, which value is corresponding to a level of importance of the packet along a linear scale. The marking circuit 1501 may be configured to also take an expected amount of resources needed to serve the packet, when marking the packet. The transmitting node may comprise the marking circuit 1501 comprising a marker entity that marks the packets depending on an expected value of the bits of the packets.

The transmitting node comprises a transmitting circuit 1502 configured to transmit the packet to a receiving node 12. The level of importance may be based on one or more of: contents of the packet payload, a specific type of packet flow, and throughput commitments.

The transmitting node may further comprises a receiving circuit 1503 configured to receive the packet from another node, and/or to receive packets from the receiving node.

The embodiments herein for transmitting packets may be implemented through one or more processors, such as a processing circuit 1504 in the transmitting node depicted in FIG. 15, together with computer program code for performing the functions and/or method steps of the embodiments herein. The program code mentioned above may also be provided as a computer program product, for instance in the form of a data carrier carrying computer program code for performing embodiments herein when being loaded into the transmitting node. One such carrier may be in the form of a CD ROM disc. It is however feasible with other data carriers such as a memory stick. The computer program code may furthermore be provided as pure program code on a server and downloaded to the transmitting node.

Those skilled in the art will also appreciate that the various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The transmitting node further comprises a memory 1505 that may comprise one or more memory units and may be used to store for example data such as values, expected amount of resources needed to serve a packet, channel/bearer information, applications to perform the methods herein when being executed on the transmitting node or similar.

In the drawings and specification, there have been disclosed exemplary embodiments herein. However, many variations and modifications can be made to these embodiments without substantially departing from the principles of the embodiments. Accordingly, although specific terms are employed, they are used in a generic and descriptive sense only and not for purposes of limitation, the scope of the embodiments herein being defined by the following claims.

The invention claimed is:

1. A method in a receiving node for handling packets for a wireless device in a radio communications network, comprising:
   receiving a packet from a transmitting node, which packet is marked with a value, wherein the value is corresponding to a level of importance of the packet along a linear scale; and
   handling the packet based on the value and an expected amount of resources needed to serve the packet;
   wherein the handling is based on a realized value, wherein the realized value is the marked value divided by the expected amount of resources needed to serve the packet.

2. A method according to claim 1, wherein the handling comprises to maximize the realized value of served packets over a bottleneck.

3. A method according to claim 1, wherein the handling is related to share resources when packet scheduling, packet dropping or a combination of packet scheduling and dropping over a bottleneck resource which aims to maximize the total amount of realized value based on the value.

4. A method according to claim 1, wherein the resources comprise radio resources, packet overhead at lower layers, or processing cost.

5. A method according to claim 1, further comprising
   determining the expected amount of resource required to send a single bit on a radio bearer.

6. A method according to claim 1, wherein a bit of the packet is marked with the value and the handling is taking an amount of bits of the packet into account in conjunction with the value.

7. A method according to claim 1, wherein a total value of the packet, to be taken into account in a resource allocation when handling the packet, is a sum of the values for each bit served.

8. A method in a transmitting node for handling packets for a wireless device in a radio communications network, comprising
   marking a packet with a value, which value is corresponding to a level of importance of the packet along a linear scale; and
   transmitting the packet to a receiving node;
   wherein transmitting the packet is based on a realized value, wherein the realized value is the marked value divided by the expected amount of resources needed to serve the packet.

9. A method according to claim 8, wherein the level of importance is based on one or more of: contents of a payload of the packet, a specific type of packet flow of the packet, throughput commitments, measured throughput of the packet flow of the packet and/or user equipment, a subscription of the user equipment and/or data usage history of the user equipment.

10. A method according to claim 8, wherein the marking is also taking an expected amount of resources needed to serve the packet.

11. A receiving node for handling packets for a wireless device in a radio communications network, comprising:
    a receiving circuit configured to receive a packet from a transmitting node, which packet is marked with a value, wherein the value is corresponding to a level of importance of the packet along a linear scale; and
    a handling circuit configured to handle the packet based on the value and an expected amount of resources needed to serve the packet;
    wherein the handling circuit is configured to handle the packet based on a realized value, wherein the realized value is the marked value divided by the expected amount of resources needed to serve the packet.

12. A receiving node according to claim 11, wherein the handling circuit is configured to maximize the realized value of served packets over a bottleneck.

13. A receiving node according to claim 11, wherein the handling circuit is configured to share resources when packet scheduling, packet dropping or a combination of packet scheduling and packet dropping over a bottleneck resource which aims to maximize the realized value.

14. A receiving node according to claim 11, wherein the resources comprise radio resources, packet overhead at lower layers, or processing cost.

15. A receiving node according to claim 11, further comprising
    a determining circuit configured to determine the expected amount of resource required to send a single bit on a radio bearer.

16. A receiving node according to claim 11, wherein a bit of the packet is marked with the value and the handling circuit is configured to take an amount of bits of the packet into account in conjunction with the value.

17. A receiving node according to claim 11, wherein the handling circuit is configured to take a total value into account in a resource allocation, wherein the total value of the packet is a sum of the values for each bit served.

18. A transmitting node for handling packets for a wireless device in a radio communications network, comprising
    a marking circuit configured to mark a packet with a value, which value is corresponding to a level of importance of the packet along a linear scale; and
    a transmitting circuit configured to transmit the packet to a receiving node;
    wherein the transmitting circuit is configured to transmit the packet based on a realized value, wherein the realized value is the marked value divided by the expected amount of resources needed to serve the packet.

19. A transmitting node according to claim 18, wherein the level of importance is based on one or more of: contents of a payload of the packet, a specific type of packet flow of the packet, throughput commitments, measured throughput of the packet flow of the packet and/or user equipment, a subscription of the user equipment and/or data usage history of the user equipment.

20. A transmitting node according to claim 18, wherein the marking circuit is configured to also take an expected amount of resources needed to serve the packet, when marking the packet.

* * * * *